June 12, 1962     W. C. YOCUM     3,038,490
PIERCING VALVE

Filed Feb. 21, 1961     2 Sheets-Sheet 1

INVENTOR.
William C. Yocum
BY Webb, Mackey & Burden
HIS ATTORNEYS

June 12, 1962   W. C. YOCUM   3,038,490
PIERCING VALVE
Filed Feb. 21, 1961   2 Sheets-Sheet 2

INVENTOR.
William C. Yocum
BY Webb, Mackey & Burden
HIS ATTORNEYS

United States Patent Office 3,038,490
Patented June 12, 1962

3,038,490
PIERCING VALVE
William C. Yocum, Mount Lebanon, Pa., assignor to Superior Valve & Fittings Co., Pittsburgh, Pa., a corporation of Pennsylvania
Filed Feb. 21, 1961, Ser. No. 90,696
7 Claims. (Cl. 137—318)

This invention relates to a piercing valve and more particularly to one which affords access to fluid under pressure systems, such as refrigeration systems, to determine pressure of a refrigerant in the system and, when required, to permit charging the system with additional refrigerant.

Heretofore, fluid under pressure systems, especially the hermetic type, lacked any valve or device which provided access to the system for charging and/or determining pressure of the fluid therein without cutting out a section of tubing and substituting therefor a valve. To install such a valve and before cutting out the section of tubing, the system usually was pumped down to relieve internal pressure and, in some cases, the fluid was withdrawn. After installation of the valve, the system was recharged with the fluid and repressurized. Thus, obtaining access to the system was both time consuming and costly.

A few years ago, piercing valves were developed for providing access to fluid under pressure systems, particularly refrigeration ones, without cutting out a section of tubing from the system and substituting for the cut-out section a valve. These piercing valves have a saddle which engages an underside of tubing to be pierced and a casing carrying a piercing member located on the top side of the tubing opposite the saddle. The saddle and casing are adjustably connected together to bring them into engagement with the tube for piercing and piercing results from turning a hand wheel which advances a piercing member through a wall of the tube. Extending through the casing is a passageway having one end in connection with an opening in the tube resulting from piercing and having the other end adapted for connection with a pressure gauge or a source of fluid under pressure for recharging the system.

To supply a piercing valve for the range of popular sizes for refrigeration systems, manufacturers have had to produce at least two different sizes of the same valve, one for smaller diameter tubing and a second for larger diameter tubing. The range of popular refrigeration tube sizes is from about 3/16" outside diameter to about 5/8" outside diameter. Thus, manufacturers, suppliers, and retailers of these piercing valves have all experienced increased costs of carrying on business because two different sizes of the same valve had to be made, stocked and handled to accommodate the whole range of popular tube sizes.

To make a piercing valve which has ability to accommodate the entire range of popular refrigeration tube sizes requires solution of difficult problems such as providing a fluid-tight seal between casing and outside periphery of the tube to be pierced for each size of tube falling within the range. This seal must be made before piercing and maintained thereafter so that pressure of the fluid in the system is kept at a desired level and so that there is no leakage of fluid from the system.

Another problem requiring solution concerns amount of penetration by the piercing member into each size of tube of the entire range of sizes. It is essential that the piercing member not penetrate the bottom side of the tube where there is no seal to generate a leak in the system. At the same time, the piercing member must penetrate into the tube to a depth which produces a hole of sufficient size that recharging of the system is not unduly lengthy. Furthermore, to insure easy, efficient and substantially trouble-free installation and operation of the piercing valve, its stem preferably has a fixed length of travel from a start position to a finish position for all tubes falling within the range of sizes. Thus, three factors—avoidance of penetration of the bottom side of the tube, size of the hole produced by piercing, and a fixed length of travel of the valve stem—must be taken into account when developing a piercing valve which accommodates the entire range of popular tube sizes. In taking these three factors into account, I have found that the amount of travel of the piercing member carried by the valve stem when moving from start to finish position is greater than the diameter of the smallest tube where adequate size holes are made in the larger diameter tubes of the range so that the bottom side of the smaller diameter tubes is subject to penetration by the piercing member of the valve.

I have invented a piercing valve which can accommodate the whole range of popular tube sizes for refrigeration systems and which is suitable for a wide range of tube sizes unrelated to refrigeration systems, thereby eliminating need for manufacture and handling of at least two different sizes of the same valve and which solves the difficult problems previously mentioned. Specifically, my piercing valve comprises a base plate which has a saddle extending lengthwise for receiving and supporting a part of a length of tube. The saddle has downwardly and inwardly sloping side walls which meet to form a bottom. Each side wall has a plurality of ridges extending longitudinally thereof and spaced apart from each other by a notch.

A ridge on one side wall has a corresponding ridge on the other side wall to form a pair adapted to engage a tube of a given diameter. The lowermost pair of ridges of the saddle are located above the bottom and are terminals of a chord of a circle, the circumference of which is substantially equal to the outside circumference of a tube of a first given diameter for engagement by the lowermost pair of ridges.

This chord has a length dimension greater than the radius of the circle but less than one and one-third greater than the radius.

The next pair of ridges above the lowermost pair and each pair of ridges thereabove the next pair are terminals of a chord of a circle the circumference of which is substantially equal to the outside circumference of a tube of a greater given diameter than said first given diameter with each of the chords above the first mentioned chord having a length dimension which increases according to an arithmetic progression. The common difference between the lengths of two consecutive chords is the length of the first mentioned chord.

A radius line extending from each ridge of each pair above the lowermost pair intersects substantially at the center of the tube adapted to be engaged by each pair above the lowermost pair to form an included angle of substantially about 105° to 135°.

Opposite the base plate and on the opposite side of the tube therefrom is a casing. Operable cooperating means such as bolts extend between and engage the base plate and casing for moving them into piercing position with the tube disposed upon the saddle. A passageway extends through a part of the casing and has two spaced apart openings through its walls.

Within the casing is a stem having a tube piercing member which terminates in a point and a passageway opening and closing member located for travel into and out of engagement with a seat which straddles a portion of the passageway. Travel of the opening and closing member into engagement with the seat closes the passageway to flow of fluid therethrough and travel of the opening and closing member out of engagement with the seat permits flow of fluid through the passageway.

The stem is disposed in a part of the passageway and is movable through a given length of travel from a starting position whereat the piercing member is out of engagement with the tube and hte opening and closing member is out of engagement with the seat to a finish position whereat a part of the piercing member has traveled through one of said openings of the passageway and has penetrated the wall of the tube to make a hole therethrough and extends into the tube and the opening and closing member engages the seat. The opening of the passageway through which a part of the piercing member travels is opposite the saddle of the base plate.

Adjacent the opening of the passageway opposite the saddle is an inwardly extending receptacle of the casing for receiving and engaging a gasket made from a resilient material. The gasket is disposed in the receptacle and extends toward the saddle to provide a connection between the passageway of the casing and the hole in the tube for flow of fluid therethrough. The gasket also effects a fluid-tight seal with that part of the outside periphery of the tube completely surrounding and immediately adjacent the hole in the tube. The piercing member extends through the gasket into the tube when the stem has reached finish position.

The gasket has a durometer from about 50 to about 80 Shore A scale and a length such that the amount of penetration of its point into the tube when the stem has reached finish position is about substantially plus, minus 25% of the outside diameter of the tube measured from its central axis.

In the accompanying drawings, I have shown a preferred embodiment of my invention in which.

Figure 1:
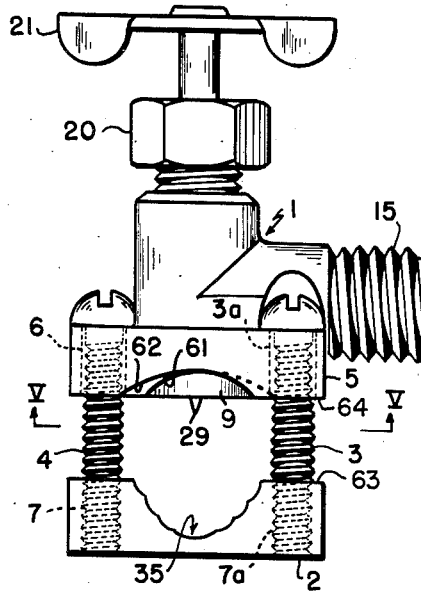
FIGURE 1 is a side elevation view of my piercing valve.

Referring to the drawings, my piercing valve comprises a casing 1 and a base plate 2 with two threaded bolts 3 and 4 extending therebetween and engaging both the casing and the base plate. Bolt 3 is in a first clearance bore 3a of a flange 5 of the casing and in a first threaded bore 7a of the base plate and the other bolt 4 is in a second clearance bore 6 of the flange of the casing and in a second threaded bore 7 of the base plate. Rotation of the bolts in one direction moves the casing and base plate toward each other to bring them into piercing position (FIGURES 3 and 4) whereat the base plate engages the bottom side 8a of a tube 8 and the casing through a gasket 9 engages the top side 8b of the tube 8 with the tube positioned between the casing and the base plate. Operation of the bolts in the opposite direction separates the casing and the base plate from the tube to permit removal of the valve from the tube.

As shown in FIGURES 1–4 inclusive, the casing 1 has a passageway 10 with two branches 11 and 12 intersecting at right angles to one another. Branch 11 has an opening 13 through the casing wall opposite the base plate and branch 12 has an opening 14 through the casing wall at an end of a nipple 15 integral with the casing and adapted to be connected to a pressure gauge (not shown) or a pipe (not shown) leading to a source of fluid under pressure.

In line with branch 11 and connecting with the intersection of the two branches 11 and 12 is a threaded bore 16 which extends to the top of the casing where it terminates in a hole 17. Disposed in the threaded bore is a valve stem 18 which projects out through the hole and out through an opening 19 in a cap 20. The cap fits over and is screwed onto the top of the casing. The upper end of the stem 18 carries a hand wheel 21 for rotation thereof.

The stem has a threaded barrel 22 which travels the threads of the bore 16 as the stem moves vertically therein. Between the inside of the cap 20 and the top of the casing are a packing ring 23 and a stop washer 24 which rests upon a shoulder 25 at the top of the casing and which engages the bottom of the packing ring. The stem extends through a central bore of both the washer and the packing ring.

Figure 3:
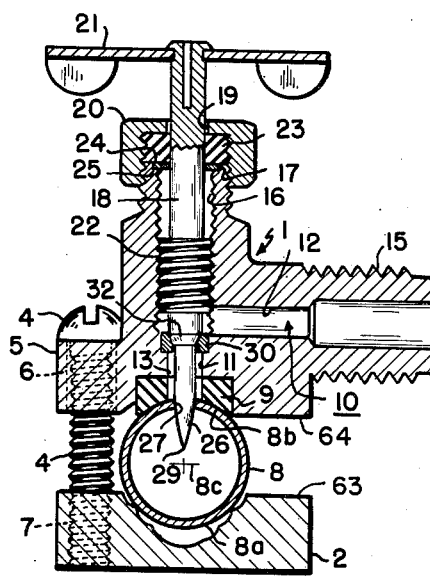
FIGURE 3 is a section view along the line III—III of FIGURE 2 showing the piercing member at finish position.

Connected to the lower end of the stem and projecting downwardly therefrom and into branch 11 of the passageway 10 is a piercing member 26 for penetrating the wall of the tube to make a hole 27 therein, as shown in FIGURE 3. The piercing member comprises a shank 28 which tapers to and terminates in a sharp point 29. The amount of taper is such that the tube wall is penetrated by the shank to produce a good size hole and is not crushed. Preferably the hole produced by the piercing member reaching finish position has a diameter from about 50% to about 100% of the diameter of the shank 28. I have found that good results in piercing the popular range of refrigerator system tube sizes are obtained when using a piercing member .593" long, .093" in diameter, with a taper .272" long produced by an arc of a circle having 1 3/16" radius.

In branch 11 of the passageway and just below its intersection with branch 12 is an annular valve seat 30 completely surrounding a part of the length of the branch and preferably made of nylon. The valve seat is located upon an annular recess 31 of the passageway and is positioned along the branch to engage a valve or opening and closing member 32 carried by the stem. When the valve member engages the seat, it prevents flow of fluid through the passageway of the casing.

Surrounding the opening 13 of the branch 11 is an inwardly extending receptacle 33 of the casing for receiving and positioning the gasket 9 which extends toward the tube 8 and into engagement with that part of its outside periphery surrounding the hole 27 made by the piercing member. The gasket effects a fluid-tight seal with the outside of the tube and provides an interconnection between the hole 27 through the tube and the branch 11 through its longitudinal bore 34 for flow of fluid in either direction through branches 11 and 12. As shown in FIGURE 3, the piercing member extends through the longitudinal bore 34 of the gasket when the tube is pierced.

It is important that before piercing the tube, this seal be effected to prevent any leakage of fluid or pressure from the system. In addition to effecting the seal between the tube and the casing, the gasket assists in regulating the amount of penetration of the piercing member into each tube of a given diameter by functioning as a spacer between the tube and the casing. Accordingly, it is important that the gasket be made from a resilient material such as rubber or synthetic rubber and that it have a certain hardness and a certain length for providing both the required seal and the necessary spacing. I have found that the hardness of the material from which the gasket is made should be, measured by a durometer, from about 50 to about 80 Shore A scale.

The length of the gasket is such that the amount of penetration of the point 29 of the piercing member 26 into the tube when the piercing member has reached finish position is about substantially plus, minus 25% of the outside diameter of the tube measured from its central axis. For tubes having from 3/16" through 1/4" outside diameter, I have found that a gasket about .422" in length is satisfactory and for tubes having from 5/16" through 5/8" outside diameter, a gasket .140" in length is satisfactory.

Figure 4:
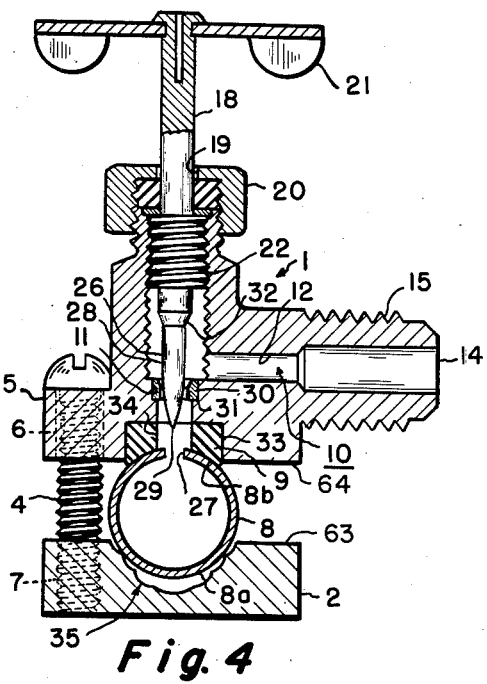
FIGURE 4 is a section view similar to that of FIGURE 3 but showing the piercing member at start position and after piercing the tube.

To pierce a tube, the piercing member 26 travels through a fixed distance from a start position defined by engagement of the upper end of the barrel 22 with the stop washer 24 to a finish position defined by engagement of the valve member 32 with the seat 30. Thus, when piercing each tube size from the smallest to the largest, the piercing member travels through a fixed distance. Accordingly, the piercing operation is substantially trouble-free because one simply turns the hand wheel to move the piercing member from start to finish position. FIGURE 4 shows the stem and the piercing member in start position with the barrel in contact with the stop washer and the point 29 out of engagement with the tube and the valve member out of engagement with the seat. FIGURE 3 shows the stem and the piercing member in finish position with the valve member in engagement with the seat 30 and the point 29 within the tube 8 and at a position therein plus, minus 25% of the outside diameter of the tube measured from its central axis 8c.

The base plate 2 has a saddle 35 extending lengthwise and substantially parallel to the longitudinal axis of the tube which is disposed thereon as shown in FIGURES 1–4. The saddle has downwardly and inwardly sloping side walls 36 and 37 which meet to form a bottom 38. Each side wall has a plurality of longitudinally extending ridges spaced apart from each other by a notch 39 with side wall 36 having ridges 40, 41, 42 and 43 with ridge 43 being the top edge of its side wall and side wall 37 having ridges 44, 45, 46 and 47 with ridge 47 being the top edge of its side wall. A ridge on one side wall has a corresponding ridge on the other side wall with each ridge substantially equidistantly spaced from the bottom 38 to form a pair of ridges adapted to engage, support and position a tube of a given diameter. Ridges 40 and 44 form the lowermost or first pair and are adapted to engage a tube of about 3/16" outside diameter; ridges 41 and 45 the next pair above the lowermost pair form the next or second pair and are adapted to engage a tube of about 1/4" outside diameter; ridges 42 and 46 form the third pair and are adapted to engage a tube of about 3/8" outside diameter; and ridges 43 and 47 are the fourth pair and the top edges of the saddle and are adapted to engage a tube about 1/2" outside diameter.

The second pair of ridges also engages a tube of about 5/16" outside diameter and the fourth pair of ridges also engages a tube of about 5/8" outside diameter in a way to be more fully described hereinafter. In addition to engaging the second pair of ridges, a 1/4" tube contacts the first pair of ridges. Likewise the 3/8" tube also contacts the second pair of ridges and the 1/2" tube also contacts the third pair of ridges.

Figure 7:
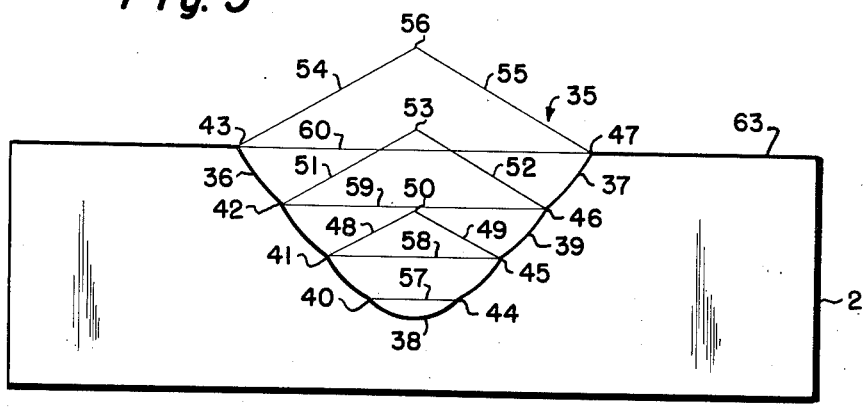
FIGURE 7 is an enlarged side elevation view of the base plate of FIGURE 6.

Location of the ridges along the sides of the saddle and the distance across the saddle from one ridge of a pair to the other ridge of that pair is important because each pair of ridges in combination with the hardness and length of the gasket position a tube of a given diameter on the valve relative to the piercing member to achieve the required seal between the tube and the casing and to regulate the amount of penetration of the piercing member into each tube of a given diameter falling within the range of tube sizes for which the valve is designed. The lowermost pair of ridges of the saddle are located above the bottom and are terminals of a chord 57 of a circle, the circumference of which is substantially equal to the outside circumference of a tube of the smallest diameter of the range of sizes. This lowermost pair of ridges is so located on the saddle that it engages, supports and positions the smallest diameter tube which is 3/16" outside diameter. The chord has a length dimension greater than the radius of the circle but less than one and one-third greater and for the base plate of FIGURE 7 is 7/64".

The next pair of ridges above the lowermost pair and each pair of ridges thereabove the next pair are terminals of a chord of a circle the circumference of which is substantially equal to the outside circumference of a tube of a given diameter. Each of the chords above the first pair has a length which increases according to an arithmetic progression where the common difference between the lengths of two consecutively vertically spaced chords is the length of the first mentioned chord. For example, the length of the cord 58 of the second pair of ridges is 7/32"; the length of the chord 59 of the third pair of ridges is 21/64"; and the length of the chord 60 of the fourth pair of ridges is 7/16".

A radius line extending from each ridge of each pair above the lowermost pair intersects substantially at the center of the tube adapted to be engaged by each pair above the lowermost pair to form an included angle of substantially about 105° to 135°. Thus, for the 1/4" tube radius, lines 48 and 49 intersect at center 50 to form an included angle of 120°; for the 3/8" tube radius, lines 51 and 52 intersect at center 53 to form an included angle of 120°; and radius lines 54 and 55 intersect at center 56 to form an included angle of 120°. Accordingly, for each pair of ridges above the first pair, I locate it by the length of the chords as described and by the intersection of the radius lines to form the included angle of substantially about 105° to 135°.

While some of the pairs of ridges are engaged by more than one size of tube, each pair of ridges is located upon the side walls of the saddle as described herein.

The location of the ridges according to my invention also provides for engagement, support and positioning of tube sizes which fall between two consecutive tube sizes employed to locate two consecutive pairs of ridges. An example of such a tube size falling between two selected sizes is the 5/16" tube which is between the 1/4" tube used to locate the second pair of ridges and the 3/8" tube used to locate the third pair of ridges.

Figure 2:
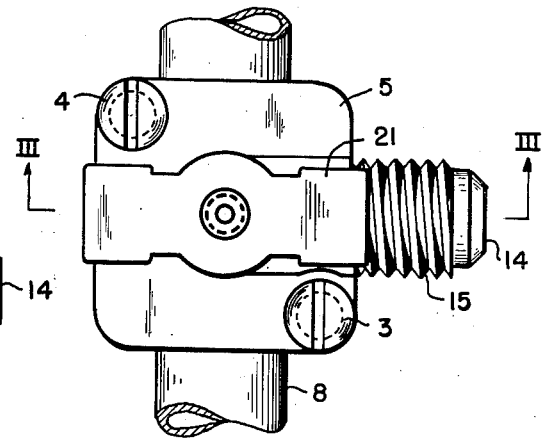
FIGURE 2 is a plan view of the valve of FIGURE 1 showing a tube positioned therein.
Figure 5:
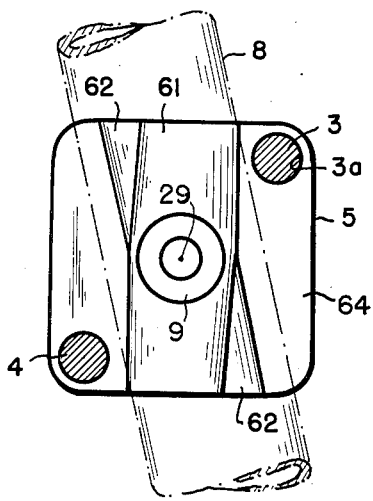
FIGURE 5 is a view along the line V—V of FIGURE 1 showing a tube of large diameter positioned for piercing.
Figure 6:
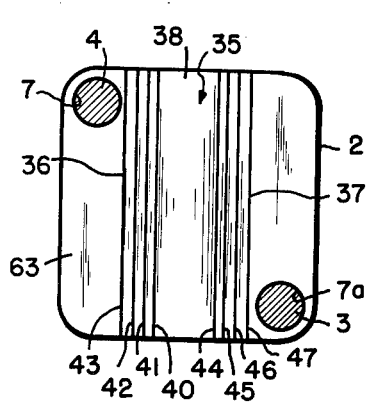
FIGURE 6 is a plan view of the base plate of the valve of FIGURE 1.

The flange 5 of the casing 1 has on that surface opposite the base plate a longitudinal concave depression 61 running from end to end and parallel to and opposite the saddle 35. As shown in FIGURES 2, 5 and 6, the two bolts 3 and 4 or operable link members are on opposite sides of the saddle 35 and of the depression 61 and diagonally opposite parts of both the flange 5 and the base plate 2. Such a disposition of the two bolts affords a good mounting of the casing and base plate upon the tube while providing substantially even distribution of stresses generated by bringing the casing and base plate to and maintaining them in piercing position.

Extending inwardly from each end of the depression 61 and on diagonally opposite sides thereof is a groove 62 which runs angularly toward the center line of the depression. The two grooves are in tandem and are on those parts of the flange opposite the parts through which the two bolts extend. By positioning the tube 8 as shown in FIGURE 5 so that it is crosswise of the depression and the saddle and so that it engages the two grooves and rests upon the top edges or ridges 43 and 47 of the saddle, a larger diameter tube than a 1/2" diameter tube which lays along the central axis of the casing and base plate can be accommodated by the piercing valve, thereby increasing the range of tube sizes. Specifically, a tube having an outside diameter 5/8" can be successfully pierced through use of the grooves 62 of the flange of the casing 1.

Figure 8:
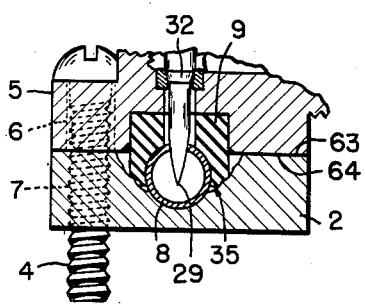
FIGURE 8 is a fragmentary section view similar to FIGURE 3 showing the smallest diameter tube in piercing position.

To assure that the smallest diameter of tube will not be pierced through its bottom wall, the flange 5 of the casing 1 and the base plate 2 are so made that the top surface 63 of the base plate defining the saddle and the bottom surface 64 of the flange 5 defining the depression and the two grooves engage one another when the piercing valve is mounted upon the smallest diameter tube of the range and the two bolts are operated to bring the casing and base plate to piercing position (FIGURE 8). With the gasket effecting the seal between the tube and the casing, the bottom surface of the flange and the top surface of the base plate engage one another, thus positioning the piercing member at finish position of the stem to prevent penetration of the bottom side of the tube by the point 29. However, it is not essential that the flange and the base plate be so designed that the respective top and bottom surfaces thereof engage one another when the valve is mounted upon the smallest diameter tube of a range because the length and hardness of the gasket in combination with the location of the ridges of the saddle so locate the tube and position the piercing member that when the piercing member has reached finish position, its point has not penetrated the bottom side of the tube.

To pierce a tube, the base plate is placed beneath the tube which is disposed upon the saddle and the casing located over the top of the tube followed by turning of the screws to bring the base plate and casing into piercing position to effect the seal between the casing and the tube. Of course, the hand wheel has previously been turned to bring the barrel into engagement with the stop washer so that the piercing member does not engage the top of the tube. In piercing position, the particular pair of ridges adapted to be engaged by the tube in combination with the hardness and length of the gasket position the tube and the casing so that travel of the piercing member from starting position, FIGURE 4, to finish position, FIGURE 3, leaves the point within plus, minus 25% of the outside diameter of the tube measured from its central axis.

Piercing of the tube results from merely turning the hand wheel to advance the piercing member from start to finish position with engagement of the valve member upon the seat arresting penetration of the piercing member into the tube and defining finish position.

After piercing, the hand wheel is rotated in a reverse direction to withdraw the piercing member from the tube and simultaneously move the valve from its seat to permit flow of fluid from the tube to the casing or in the reserve direction.

My piercing valve provides an important advantage for fluid under pressure systems because it furnishes a single piercing valve for use with a wide range of tube sizes, thereby avoiding manufacture, handling and sale of at least two different sizes of the same valve. Thus, a wide range of tube sizes is served by a single valve to realize substantial savings from a manufacture, inventory and handling standpoint.

While I have shown and described a present preferred embodiment of my invention, it is to be understood that it may be otherwise embodied within the scope of the following claims.

I claim:

1. A piercing valve adapted for mounting upon fluid-carrying tubes of different diameters comprising a base plate having a saddle extending lengthwise thereof for receiving and supporting a part of a length of a tube, said saddle having downwardly and inwardly sloping side walls which meet to form a bottom thereof, each of said side walls having a plurality of ridges extending longitudinally thereof and spaced apart from each other by a notch, a ridge on one side wall having a corresponding ridge on the other side wall to form a pair adapted to engage a tube of a given diameter, the lowermost pair of ridges of said saddle being located above the bottom thereof and being terminals of a chord of a circle, the circumference of which is substantially equal to outside circumference of a tube of a first given diameter for engagement by said said lowermost pair, said chord having a length dimension greater than the radius of said circle but less than one and one-third greater than said radius, the next pair of ridges above said lowermost pair and each pair of ridges thereabove said next pair being terminals of a chord of a circle the circumference of which is substantially equal to outside circumference of a tube of a given diameter greater than said first given diameter, each of said chords above said first mentioned chord having a length dimension which increases according to an arithmetic progression where the common difference between the lengths of two consecutive chords is the length of said first mentioned chord, a radius line extending from each ridge of each pair above said lowermost pair intersecting substantially at the center of the tube adapted to be engaged by each pair above said lowermost pair to form an included angle of substantially about 105° to 135°, a casing opposite said base plate and positioned so that said base plate and said casing are on substantially opposite sides of said tube disposed in said saddle of said base plate, operable cooperating means extending between and engaging said base plate and said casing for moving said casing and said base plate into piercing position with said tube to be pierced, a passageway extending through a part of said casing and having two spaced apart openings through its walls, a stem having a tube piercing member which terminates in a point and a passageway opening and closing member disposed for travel into and out of engagement with a seat straddling a portion of said passageway, travel of said opening and closing member into engagement with said seat effecting a closing of said passageway to flow of fluid therethrough and travel of said opening and closing member out of engagement with said seat permitting flow of fluid through said passageway, said stem being disposed in said casing including a part of said passageway and being movable through a given length of travel from a starting position whereat said piercing member is out of engagement with said tube and said opening and closing member is out of engagement with said seat to a finish position whereat a part of said piercing member has traveled through one of said openings of the passageway and has penetrated a wall of said tube to make a hole therethrough and extends thereinto and said opening and closing member has engaged said seat, said one opening of said passageway being opposite said saddle, said casing having adjacent said one opening a seat for receiving and engaging a gasket, a gasket made from a resilient material in said seat, extending towards said saddle and interposed between said one opening of said passageway and said tube, said gasket being adapted for effecting a fluid-tight seal with that part of the outside periphery of said tube completely surrounding and immediately adjacent said hole in the tube resulting from penetration thereof by said piercing member and being adapted for providing a connection between said passageway of said casing and said hole in the tube for flow of said fluid therethrough, said piercing member extending through said gasket into said tube when said stem has reached finish position, said gasket having a durometer from about 50 to about 80 Shore A scale and a length such that amount of penetration of said point of said piercing member into said tube disposed upon said saddle when said stem has reached finish position is about substantially plus, minus 25% of outside diameter of said tube measured from its central axis.

2. The piercing valve of claim 1 characterized by said operable cooperating means extending between said casing and said base plate comprising two operable link members each located at a substantially diagonally opposite part of said base plate and said casing relative to the other and on an opposite side of said saddle from the other, operation of said link members moving said casing and said base plate toward and away from each other.

3. The piercing valve of claim 1 characterized by that surface of said casing opposite said base plate having thereon two grooves each extending inwardly from an end of the casing opposite an end of said saddle of the base plate, each groove running angularly toward the center line of said saddle, being so located on said surface of said casing as to be on diagonally opposite sides of said saddle and being arranged substantially in tandem.

4. The piercing valve of claim 1 characterized by said operable cooperating means extending between said casing and said base plate comprising two operable link members each located at a substantially diagonally opposite part of said base plate and said casing relative to the other and on an opposite side of said saddle from the other, operation of said link members moving said casing and said base plate toward and away from each other, and by that surface of said casing opposite said base plate having thereon two grooves each extending inwardly from an end of the casing opposite an end of said saddle of the base plate, each groove running angularly toward the center line of said saddle, being so located on said surface of said casing as to be on diagonally opposite sides of said saddle and being arranged substantially in tandem.

5. The piercing valve of claim 1 characterized by said tube piercing member having a taper running from a shank part thereof toward and terminating in a piercing point such that the hole in the wall of said tube resulting from said stem reaching finish position has a diameter from about 50% to about 100% of the diameter of said shank part of said piercing member.

6. The piercing valve of claim 1 characterized by said casing and said base plate having oppositely disposed bearing surfaces which contact each other when said lowermost pair of ridges engage a tube having a diameter corresponding to said given diameter of tube for which said lowermost pair is intended and when said operable cooperating means have moved said casing and said base plate into piercing position.

7. In a piercing valve adapted for mounting upon fluid-carrying tubes of different diameters, said valve having a base plate for receiving and supporting a part of a length of a tube, having a casing opposite said base plate and positioned so that said base plate and said casing are on substantially opposite sides of said tube, having operable cooperating means extending between and engaging said base plate and said casing for moving same into piercing position with said tube, having a passageway extending through a part of said casing with two spaced apart openings through walls of said casing, having a stem with a tube piercing member and a passageway opening and closing member disposed for travel into and out of engagement with a seat straddling a portion of said passageway, said stem being disposed in said casing including a part of said passageway and being movable through a given length of travel from a starting position whereat said piercing member is out of engagement with said tube and said opening and closing member is out of engagement with said seat, to a finish position whereat a part of said piercing member has traveled through one of said openings of said passageway and has penetrated a wall of said tube to make a hole therethrough and said opening and closing member has engaged said seat, having said casing with a seat adjacent said one opening of said passageway for receiving and engaging a gasket, the combination comprising a gasket made from a resilient material in said seat, extending towards said saddle and interposed between said one opening of said passageway and said tube, said gasket being adapted for effecting a fluid-tight seal with that part of the outside periphery of said tube completely surrounding and immediately adjacent said hole in the tube resulting from penetration thereof by said piercing member and being adapted for providing a connection between said passageway of said casing and said hole in the tube for flow of said fluid therethrough, said piercing member extending through said gasket into said tube when said stem has reached finish position, said gasket having a durometer from about 50 to about 80 Shore A scale and a length such that amount of penetration of said point of piercing member into said tube disposed upon said saddle when said stem has reached finish position is about substantially plus, minus 25% of outside diameter of said tube measured from its central axis, and a saddle extending lengthwise of said base plate for receiving and supporting said tube, said saddle having downwardly and inwardly sloping side walls which meet to form a bottom thereof, each of said side walls having a plurality of ridges extending longitudinally thereof and spaced apart from each other by a notch, a ridge on one side wall having a corresponding ridge on the other side wall to form a pair adapted to engage a tube of a given diameter, the lowermost pair of ridges of said saddle being located above the bottom thereof and being terminals of a chord of a circle, the circumference of which is substantially equal to outside circumference of a tube of a first given diameter for engagement by said lowermost pair, said chord having a length dimension greater than the radius of said circle but less than one and one-third greater than said radius, the next pair of ridges above said lowermost pair and each pair of ridges thereabove said next pair being terminals of a chord of a circle the circumference of which is substantially equal to outside circumference of a tube of a given diameter greater than said first given diameter, each of said chords above said first mentioned chord having a length dimension which increases according to an arithmetic progression where the common difference between the lengths of two consecutive chords is the length of said first mentioned chord, a radius line extending from each ridge of each pair above said lowermost pair intersecting substantially at the center of the tube adapted to be engaged by each pair above said lowermost pair to form an included angle of substantially about 105° to 135°.

No references cited.